United States Patent Office.

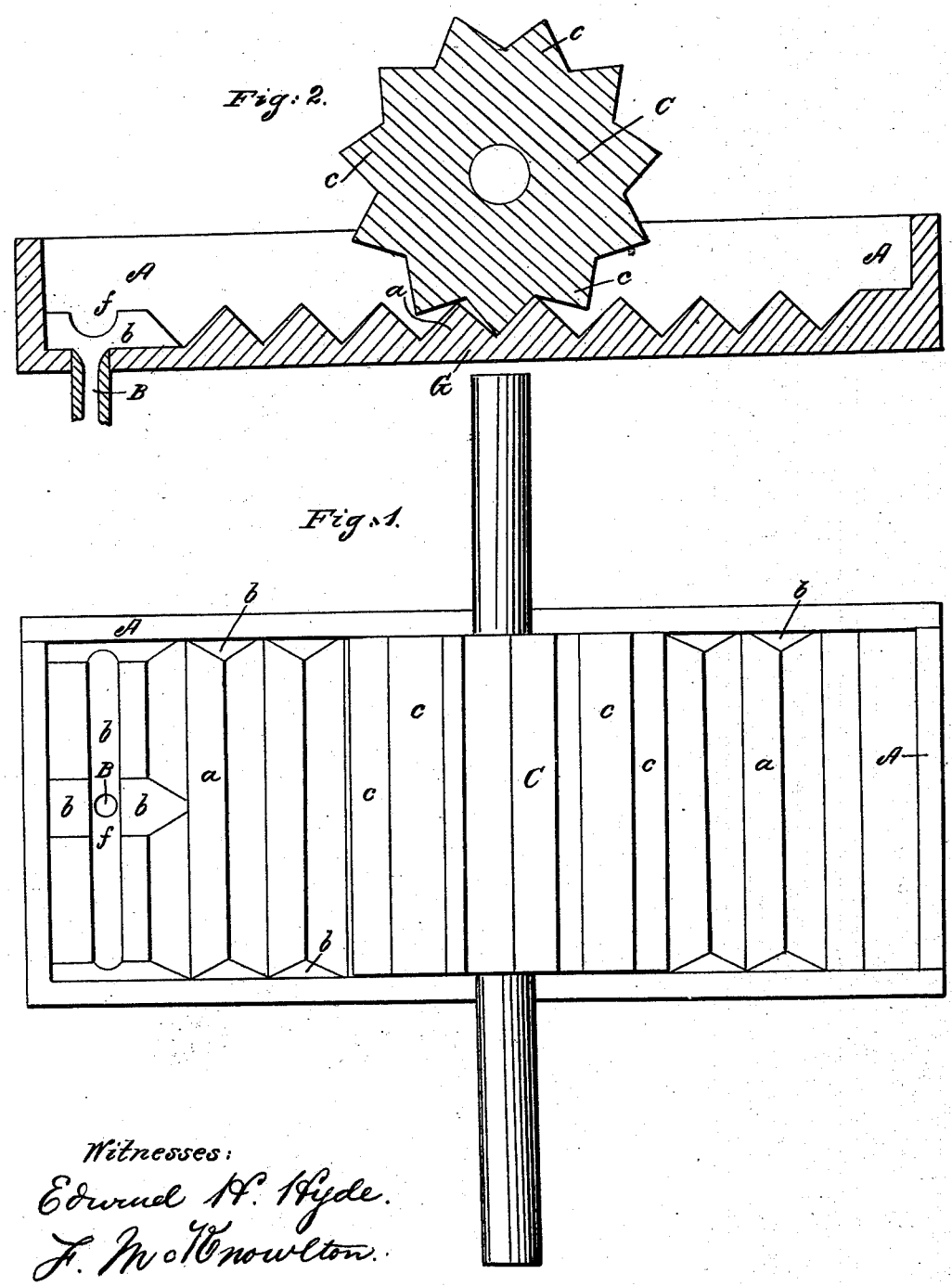

IMPROVEMENT IN BUTTER WORKER.

REUBEN R. EASTMAN, OF GRANBY, MASSACHUSETTS.

Letters Patent No. 59,985, dated November 27, 1866.

SPECIFICATION.

TO ALL WHOM IT MAY CONCERN:

Be it known that I, REUBEN R. EASTMAN, of Granby, Hampshire county, Commonwealth of Massachusetts, have invented a new and useful improved Butter Press; and I do hereby declare that the following is a full and exact description thereof, reference being had to the accompanying drawings, and to the letters of reference marked thereon in the drawings.

Figure 1 represents a plan view of my invention.

Figure 2 being a vertical section of the same.

This invention consists of an apparatus for the purpose of pressing out the liquid from newly made butter, so that the latter will pack hard and firm. This consists of a trough, A, having a convenient capacity, and having the bottom formed of a plate, G, with a number of teeth, $a\,a\,a$. In one end of this trough is put the pipe, B, which serves as an outlet for the liquid pressed from the butter gutters, $b\,b\,b$, being made so as to connect all parts of the trough A with it. Working into this trough is the roller, C, which is made so that the ends work close along the sides of the trough. This roller has teeth, $c\,c$, around its circumference, which mesh in with those in the bottom of the trough, and has handles projecting from the centre of each end. The teeth, $a\,a\,a$, in the bottom are placed so as to extend across from side to side, those on the roller being made from end to end, so as to correspond. They are made with sharp apexes so as to cut into and draw the butter under.

The operation of this device is as follows: The butter to be pressed is laid in suitable quantities along the bottom of the trough; the roller is then put on it and pressed down, being rolled along the length of the trough, A, the teeth of the roller and trough meshing together and pressing out the liquid from the butter, this liquid running through the pipe, B. There are a great many advantages to this device, as it fills a decided want in the economy of the dairy, being a great saver of time and doing its work thoroughly. A great many devices for accomplishing this work have been tried without success, owing to the difficulty of pressing the liquid out of the butter *en masse*, but my invention cuts up the butter as it presses it, opening nearly every small reservoir of the liquid secretion, allowing it to be pressed out.

Now, having described my invention, what I claim as new, and desire to secure by Letters Patent, is—

1. In a butter press the combination of the roller C, and plate G, with teeth to mesh, substantially as and for the purpose set forth.

2. The trough A, in combination with the roller C, and plate G, substantially as described.

REUBEN R. EASTMAN.

Witnesses:
 J. B. GARDINER,
 EDWARD H. HYDE.